United States Patent [19]
Winkler et al.

[11] 3,902,799
[45] Sept. 2, 1975

[54] SLIDE PROJECTOR FOR USE WITH ROUND MAGAZINES

[75] Inventors: Alfred Winkler, Munich; Peter Ungnadner, Unterhaching, both of Germany

[73] Assignee: Agfa-Gevaert Aktiengesellschaft, Leverkusen, Germany

[22] Filed: Jan. 24, 1974

[21] Appl. No.: 436,381

[30] Foreign Application Priority Data
Jan. 27, 1973 Germany............................ 2304072

[52] U.S. Cl.................................. 353/61; 353/117
[51] Int. Cl.².................. G03B 21/16; G03B 23/06
[58] Field of Search............................... 353/57–61, 353/107, 116, 117

[56] References Cited
UNITED STATES PATENTS

| | | | |
|---|---|---|---|
| 3,250,175 | 5/1966 | Braun | 353/61 |
| 3,298,277 | 1/1967 | Scharf | 353/59 |
| 3,462,216 | 8/1969 | Bennett | 353/117 |
| 3,554,638 | 1/1971 | Dimitracopoulos | 353/57 |

FOREIGN PATENTS OR APPLICATIONS

| | | | |
|---|---|---|---|
| 1,097,171 | 1/1961 | Germany | 353/57 |
| 1,027,905 | 4/1958 | Germany | 353/57 |

*Primary Examiner*—Richard E. Aegerter
*Assistant Examiner*—A. Jason Mirabito
*Attorney, Agent, or Firm*—Michael S. Striker

[57] ABSTRACT

A slide projector for use with round trays has a housing provided with a chamber which receives a portion of or an entire tray and a cooling system which is installed in the housing below the chamber and whose blower is coaxial with a properly inserted tray. The inlet opening of the cooling system is immediately adjacent to the slide gate, and that side wall of the housing which is remote from the chamber and is parallel to the optical axis of the projector lens has slots for admission of streams of cool atmospheric air which flow into the inlet opening and directly cool the gate as well as the projection lamp. A first electric motor serves to rotate the blower, and a discrete second electric motor is provided to index the tray and to actuate the slide changing mechanism.

13 Claims, 2 Drawing Figures

PATENTED SEP 2 1975　　　　　　　　　　　　　　　　　　　　3,902,799

SLIDE PROJECTOR FOR USE WITH ROUND MAGAZINES

BACKGROUND OF THE INVENTION

The present invention relates to slide projectors in general, and more particularly to improvements in slide projectors for use circular or round magazines or trays for photographic transparencies. Still more particularly, the invention relates to improvements in slide projectors of the type wherein a properly mounted round magazine is at least partially received in the housing of the projector and wherein the slide gate is located radially of a properly mounted magazine so that the slide changing or transporting mechanism moves successive or selected slides toward and away from the axis of the magazine during transport from and to the slide gate.

A drawback of presently known slide projectors for use with round magazines is that their cooling systems are incapable of removing sufficient quantities of heat, especially when a projector is in use for extended periods of time. This causes the well-known popping of slides, especially if the exposed and developed film frames are installed in paper mounts.

Another drawback of presently known slide projectors is that their cooling systems occupy too much space, particularly if the cooling systems are designed to remove substantial amounts of heat, as well as that the provision of a cooling system often contributes excessively to the bulk and adversely affects the appearance of the projector housing.

SUMMARY OF THE INVENTION

An object of the invention is to provide a slide projector with a novel and improved cooling system which is not only highly efficient but also occupies a relatively small amount of space and can be installed in that portion of the projector housing where the cooling system is properly protected and is best suited to bring about an effective cooling of the lamp, optical system, slide gate and/or other sensitive components of the projector.

Another object of the invention is to provide a novel and improved cooling system for use in slide projectors which employ round or circular magazines or trays, especially in slide projectors of the type wherein a properly mounted tray is at least partially recessed into the projector housing.

A further object of the invention is to provide the housing of a slide projector with a novel and improved arrangement of openings for admission of cool air and for evacuation or expulsion of heated air.

An additional object of the invention is to provide a slide projector for use with round magazines with improved means for powering the moving parts of the cooling system and with improved means for indexing the magazine and for actuating the slide changing mechanism.

Still another object of the invention is to provide a novel and improved rotary blower for use in a slide projector which employs round magazines for storage of photographic transparencies.

A further object of the invention is to provide a blower which is more compact than heretofore known blowers with similar heat removing capabilities and which does not adversely affect the appearance of the housing of the slide projector.

The invention is embodied in a slide projector which is designed for use with round magazines or trays and comprises a housing having a chamber serving to receive at least a portion of a round magazine in such position that the magazine is indexible about a substantially vertical axis, and cooling means including a rotary portion which is mounted in the housing below the chamber and is rotatable about an axis which coincides, at least substantially, with the axis of a round magazine in the chamber.

If the housing has a substantially rectangular outline, the chamber is preferably adjacent to one of the front corners of the housing and adjacent to a projector lens which is installed in the front wall of the housing and whose optical axis is preferably normal to and crosses in space with the axis of the rotary portion. The light source is mounted in the housing behind the projector lens and a slide gate is mounted between the lens and the light source. The cooling means has at least one inlet opening which serves to draw at least one stream of cool atmospheric air across the beam of light issuing from the light source in response to rotation of the rotary portion of the cooling means. The inlet opening is preferably immediately adjacent to the slide gate, and the housing has one or more second openings for admission of cool atmospheric air whereby the stream or streams of air flowing between the inlet opening of the cooling means and the opening or openings of the housing directly cool at least a portion of the light source as well as the slide gate. The opening or openings of the housing may be provided in a side wall which is parallel to the optical axis of the projector lens and is remote from the chamber, and/or in a portion of a top wall which may form part of a removable or pivotable cover.

The novel features which are considered as characteristic of the invention are set forth in particular in the appended claims. The improved slide projector itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
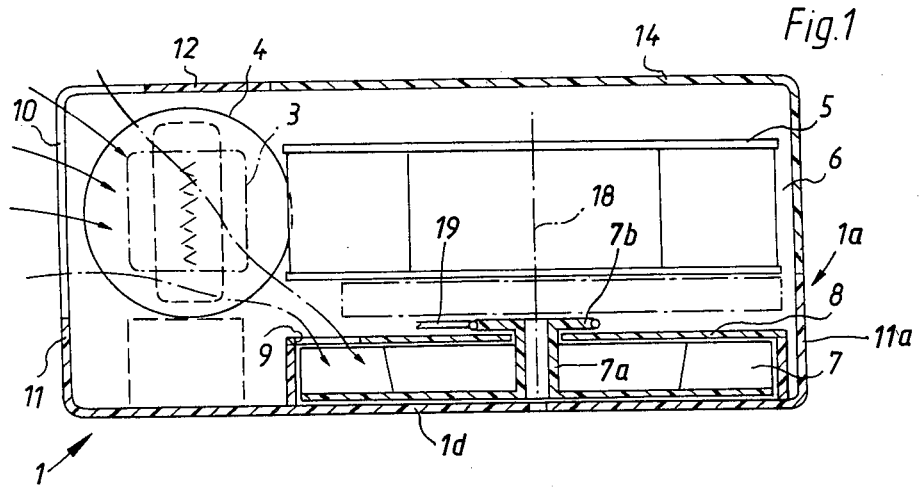
FIG. 1 is a transverse vertical sectional view of a slide projector which embodies the invention.
Figure 2:
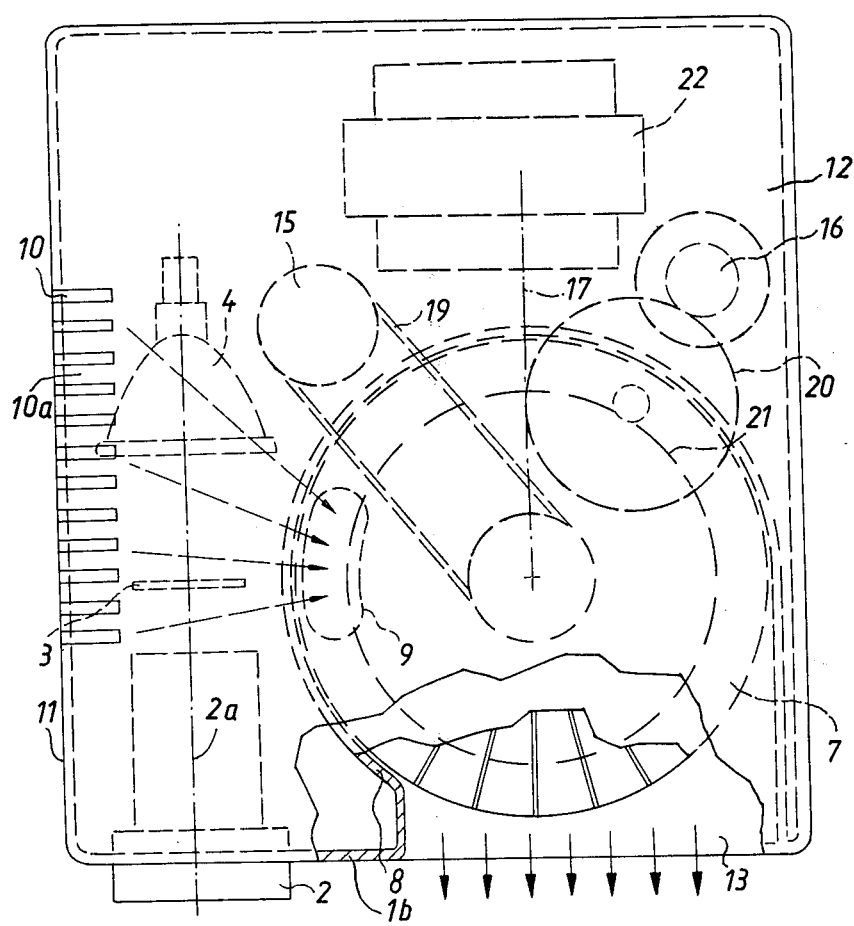
FIG. 2 is a plan view of the projector, with a portion of the housing broken away.

The slide projector which is shown in FIGS. 1 and 2 comprises a housing 1 having a substantially rectangular lower portion 1a and an upper portion or cover 14 which is removably or pivotably secured to the lower portion 1a. The housing 1 defines a preferably round chamber 6 for a circular or round slide magazine or tray 5 which is accessible to the operator when the cover 14 is lifted above or removed from the lower portion 1a. The chamber 6 is preferably adjacent to one front corner of the housing 1 and is adjacent to a projector lens 2 which is mounted in the front wall 1b of the lower portion 1a. The lens 2 is located in front of a slide gate 3 which extends radially of a properly inserted magazine 5 and is installed in front of a light source 4 including a suitable lamp and a reflector of any known design. The optical axis 2a of the projector lens 2 is normal to the axis of the magazine 5 in the chamber 6 and is preferably parallel to two side walls 11, 11a of the lower portion 1a. In the illustrated embodiment, the optical axis 2a extends between the side wall 11 and the adjacent portion of the chamber 6 for the magazine 5.

The magazine 5 is formed with customary radially extending partitions (not specifically shown) which define compartments for discrete photographic transparencies. A suitable slide changing mechanism 21 is installed in the housing 1 and is actuatable, either by hand or by a motor, to move selected slides radially of the magazine 5, i.e., between the respective compartments and a projection position in the slide gate 3. A photographic transparency which is in register with the gate 3 maintains its film frame in an optimum position for projection of the image onto a screen or the like, i.e., such transparency extends across the optical axis 2a of the projector lens 2 and intersects the light beam which issues from the source 4. It is clear that the optical system of the projector may include suitable condenser lenses and/or other optical elements of conventional design.

In accordance with a feature of the invention, the cooling means of the slide projector comprises a rotary portion or blower 7 which is coaxial with a properly inserted magazine 5 and is located at a level below the chamber 6. The blower 7 is rotatable in a compartment defined by a wall 8 forming part of the cooling means and including a substantially circular portion extending upwardly from the bottom wall 1d of the lower portion 1a and a top portion which constitutes the bottom wall of the chamber 6. A central portion 7a of the blower 7 extends through an opening in the top portion of the wall 8 and carries a pulley 7b which is driven by an endless flexible element 19. A properly inserted magazine 5 rests on a platform which is located in the lower part of the chamber 6. The diameter of the blower 7 preferably equals or closely approximates the outer diameter of the magazine 5. It will be noted that the axial length or height of the blower 7 may constitute a relatively small fraction of the depth or height of the chamber 6. Thus, the space requirements of the cooling means, especially when compared with the space requirements of a round magazine 5, are extremely small.

The inlet opening 9 of the cooling means is provided in the wall 8 close to or immediately adjacent to the slide gate 3. As shown in FIG. 2, the inlet opening 9 is kidney-shaped and extends forwardly as well as rearwardly of the slide gate 3. This opening receives cool atmospheric air which is admitted into the housing 1 via a second opening including slots 10 provided in part in the side wall 11 and in part in the top portion 12 of the cover 14. As shown in FIG. 1, each slot 10 is substantially L-shaped and has a longer portion which is vertical and a relatively short horizontal portion. The slots 10 are separated from each other by ribs 10a forming part of the side wall 11 and cover 14. If desired, the ribs 10a may be provided with or may constitute louvers or slats which partially overlie the adjacent slots 10. As mentioned above, the side wall 11 is substantially or exactly parallel to the optical axis 2a, and the axis 2a is thus located between the inlet opening 9 of the blower and the major portions of the slots 10. This insures that the streams of cool atmospheric air which is being drawn into the housing 1 when the blower 7 is driven by the flexible element 19 pass across the optical axis 2a and effectively cool the light source 4 as well as the slide gate 3. It has been found that such guidance of streams of cool atmospheric air between the slots 10 and inlet opening 9 insures a highly satisfactory cooling of the parts 4, 3 as well as of that photographic transparency which is located in the projection position. Moreover, the inflowing air cools certain parts of the slide changing mechanism 21. Since the slots 10 are L-shaped, the inflowing streams of air cool the light source 4 from one side (i.e., from the side which is adjacent to the wall 11) as well as from above, i.e., from that side which is adjacent to the portion 12 of the cover 14.

The opening or openings 13 for expulsion of hot air from the housing 1 can be provided in one or more places, for example, in the front wall 1b of the lower portion 1a. It is equally within the purview of the invention to provide several openings for expulsion of heated air; some of these openings may be provided in the front wall 1b so that the blast or blasts of hot air are discharged forwardly in substantial parallelism with the optical axis 2a, and the remaining opening or openings for evacuation of hot air may be provided in the side wall 11a which is nearest to the chamber 6 for the magazine 5.

The magazine 5 in the chamber 6 is readily accessible upon removal or pivoting of the cover 14 to an open position. The pulley 7b and the wall 8 are accessible upon removal of the magazine 5.

In accordance with a further feature of the invention, a single and therefore relatively bulky prime mover may be replaced by two discrete prime movers, e.g., two small electric motors 15 and 16. As shown in FIG. 2, the motors 15, 16 are mirror symmetrical to each other with reference to a plane 17 which includes the axis 18 of the rotary portion 7 and is parallel to the optical axis 2a of the projector lens. The motor 15 has an output shaft which carries a pulley driving the flexible element 19. The motor 16 drives a transmission 20 which, in turn, drives the slide changing mechanism 21. The mechanism 21 is combined with or includes suitable indexing means for the magazine 5. The space between the two relatively small motors 15, 16 is large enough to receive a portion of the energy source for the motors, e.g., a transformer 22.

An important advantage of the improved slide projector is that the cooling means occupies little room, that the cooling means occupies room which is readily accessible upon removal of a magazine 5, and that the inlet opening 9 is positioned to draw one or more streams of cool atmospheric air across the beam of light issuing from the light source 4 whereby such stream or streams effect a highly satisfactory cooling of the gate 3 and light source 4. The provision of two small motors 15, 16 instead of a larger single motor also contributes to compactness of the slide projector.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a combination of a slide projector and a round magazine wherein slides are disposed substantially radially with respect to the axis of the magazine, comprising a housing including a chamber arranged to receive at least a portion of said magazine; and cooling means including a rotary portion mounted in said housing adjacent to and below said chamber and below the slides in said magazine in said chamber, said portion of said cooling means being rotatable about an axis which coincides, at least substantially, with the axis of said magazine in said chamber.

2. A combination as defined in claim 1, further comprising projector lens means mounted in said housing and having an optical axis and a light source located in said housing behind said lens means and arranged to emit a beam of light into said lens means, said cooling means having at least one inlet opening arranged to draw at least one stream of cool atmospheric air across said beam of light in response to rotation of said rotary portion.

3. A combination as defined in claim 2, further comprising a slide gate disposed in said housing between said lens means and said light source and extending at least in part into said stream of cool atmospheric air.

4. A combination as defined in claim 3, wherein said inlet opening is immediately adjacent to said slide gate.

5. A combination as defined in claim 2, wherein said housing includes a wall which is substantially parallel to said beam, said optical axis being located between said wall and said cooling means and said wall having at least one second opening for admission of said stream of air into said housing and into said inlet opening in response to rotation of said rotary portion.

6. A combination as defined in claim 2, wherein said housing includes a side wall which is substantially parallel to said beam and remote from said inlet opening, said housing having at least one second opening provided in and/or close to said side wall for admission of said stream of air into said housing in response to rotation of said rotary portion.

7. A combination as defined in claim 6, wherein said housing further comprises a top wall and at least a portion of said second opening is provided in said top wall.

8. A combination as defined in claim 2, wherein said housing has at least one second opening for admission of said stream of air into said housing, the position of said second opening relative to said inlet opening being such that the stream of air flowing between said openings directly cools at least a portion of said light source.

9. A combination as defined in claim 1, further comprising a mechanism installed in said housing and actuatable to move slides into and from a magazine in said chamber, first prime mover means provided in said housing and operable to drive said rotary portion, and second prime mover means provided in said housing and operable to actuate said mechanism.

10. A combination as defined in claim 9, further comprising projector lens means mounted in said housing and having an optical axis substantially normal to and crossing in space with the axis of said rotary portion, said first and second prime mover means being substantially mirror symmetrical to each other with reference to a plane including the axis of said rotary portion and substantially parallel to said optical axis.

11. A combination as defined in claim 10, wherein each of said prime movers is an electric motor.

12. A combination as defined in claim 11, further comprising an energy source for said motors, said energy source including a portion installed in said housing between said motors.

13. A combination as defined in claim 12, wherein said portion of said energy source is a transformer.

* * * * *